United States Patent Office 3,647,609
Patented Mar. 7, 1972

3,647,609
FLAME RETARDED COMPOSITE
Henryk A. Cyba, Evanston, Ill., assignor to Universal Oil Products Company, Des Plaines, Ill.
No Drawing. Filed Sept. 26, 1969, Ser. No. 861,495
Int. Cl. B32b 5/18, 27/40
U.S. Cl. 161—160                          8 Claims

ABSTRACT OF THE DISCLOSURE

A flame retarded composite of the plastic, resin or foam bonded to a solid material by means of a flame retarded adhesive, the flame retardant in both materials being of similar chemical composition. An example is flame retarded urethane foam bonded to flame retarded urethane foam by an adhesive containing the same flame retardant as in the foam.

BACKGROUND OF THE INVENTION

Many manufacturing practices include the bonding of plastic, resin or foam to another solid material, which may be the same or different plastic, resin or foam or an entirely different type of material such as metal, wood, ceramic, concrete, fabric, rubber, leather, etc. In most cases, particularly where different types of material are bonded together, the bonding is accomplished by means of an adhesive.

In many applications, it is desired that the composite is non-burning and, accordingly, a flame retardant is incorporated in the material where possible. This is particularly true in the case of plastic, resin or foam. However, even though the plastic, resin or foam contains a flame retardant, the final composite may not be non-burning.

DESCRIPTION OF THE INVENTION

It is believed that the non-burning properties of such composites are determined by the adhesives. Furthermore, it is believed that this is a physical rather than a chemical phenonenon. A possible explanation is that the adhesive layer serves as a heat insulator, flammable vapor collector and results in a chimney effect in maintaining burning.

In accordance with the present invention, the above objection is avoided by incorporating a particular type of flame retardant into the adhesive. It is necessary that the flame retardant incorporated in the adhesive is of similar chemical composition to the flame retardant incorporated in the other member or members of the composite. Thus, for example, when the flame retardant in the foam, for example, contains halogen, the flame retardant used in the glue also must contain halogen.

In one embodiment, the present invention is directed to an article of manufacture composed of a first member being a flame retarded plastic, resin or foam firmly bonded to a second member being a solid material by means of a flame retarded adhesive, wherein the flame retardants in said first member and in said adhesive are of similar chemical composition.

As hereinbefore set forth, one member of the composite or laminate is a plastic, resin or foam. These materials are described in conventional manner and are well recognized in the industry. Reference to plastic is directed particularly to thermoplastic materials, including acetals, acrylics, cellulose esters, polyolefins, polycarbonates, styrene-butadiene polymers, urethanes, etc. Although they generally are referred to as resins, other thermoplastic materials include ABS resins (acrylonitrile-butadiene-styrene), phenoxy resins, etc. The term resin also is used to include thermosetting materials as alkyds, amino resins, including melamine-formaldehyde and urea-formaldehyde, epoxies, phenolics, polyesters, etc. Polyurethanes may be thermoplastic or thermosetting, depending upon the processing method. The foams are prepared from some of the above by including a blowing and/or other foaming agent during the manufacture.

In a preferred embodiment of the present invention, the composite comprises a polyurethane foam. The polyurethanes are prepared by the general step of reacting an isocyanate with a polyol and/or a polyester as, for example, by the reaction of toluene-2,4-diisocyanate or toluene-2,6-diisocyanate with polytetramethyleneether glycol, alone or in combination with other additional diols and/or triols and/or diisocyanates. Other isocyanates include various polyfunctional and blocked polymeric isocyanates such as phenol blocked TDI trimer, polymethylene polyphenylisocyanate, 3,3'-dimethyl-4,4'-biphenylenediisocyanate, 3,3' - dialkoxy-4,4'-diphenylenediisocyanate, methylene bis-(phenylisocyanate), etc. Other polyols include polypropyleneether glycol, ethylene oxide-modified polypropyleneether glycol, polytrimethyleneether glycol, etc. Polyesters containing two hydroxyl groups are prepared from dibasic acids, including adipic acid, phthalic acid, sebacic acid, dimer acid, etc. and are prepared by reacting with diols including, for example, ethylene glycol, propylene glycol, 1,3-propanediol, butanediol, hexanediol, etc. Polyesteramides are prepared by reacting dibasic acids with polyamines or with aminoalcohols such as ethanolamine, diethanolamine, etc. The polyurethane is prepared in conventional manner. The literature and patent art are replete with detailed descriptions of various polyurethane preparations, both the elastomer and the rigid or flexible foam, and accordingly need not be repeated in detail in the present specifications.

In another embodiment the composite comprises an epoxy resin. The epoxy resins are formed by the reaction of a 1,2-epoxy compound and a dihydricphenol or polyalcohol as, for example, the reaction of an epichlorohydrin with bis-phenol-A-[2,2-bis-(4-hydroxyphenyl) - propane]. Another epoxy resin is prepared from epoxy compound in which the epichlorohydrin group is attached directly to the cycloaliphatic portion of the molecule rather than on the alkyl chain. These resins are prepared in conventional manner. Here again, these ingredients and methods of preparation are well known in the art and need not be repeated here.

Still another plastic which is preferred as at least one member of the composite is polycarbonate. The polycarbonates comprise polyesters of carbonic acid as, for example, the polyester prepared by reacting phosgene and bis-phenol-A. Here again, these plastics are well known in the prior art and details thereof need not be repeated in the present application.

The plastic or resin is prepared in either rigid or flexible form and also as foam. As hereinbefore set forth the preferred foam is polyurethane foam. Other foams include polystyrene foam, phenolic, urea-formaldehyde, acrylonitrile-styrene, polyethylene, polypropylene, epoxies, etc. The preparation of the foamed product is well known and one or more of suitable conventional foaming agents may be employed.

In one embodiment, the product of the present invention is a composite or laminate of the same plastic as, for example, polyurethane foam sheet bonded to another polyurethane foam sheet. In another embodiment, plastic, resin or foam is bonded to a different plastic, resin or foam. In still another embodiment the plastic resin, or foam is bonded to an inorganic material. Illustrative inorganic materials include metals, as iron, steel, lead, chromium, aluminum, magnesium, nickel, copper brass, alloys as silica-magnesium-aluminum, copper-magnesium-aluminum, etc. Other inorganic materials include ceramic, concrete, etc. Other solid materials include cloth or fabric as acetate, rayon, nylon, cotton, silk, etc., wood and particularly plywood, leather, rubber, paper, cardboard, etc.

Where possible each member of the composite should contain a flame retardant and, in accordance with the present invention, the flame retardant used in all members should be of similar chemical composition. This is particularly true when a plastic, resin or foam is bonded to a plastic, resin or foam, whether the plastics, resins or foams are the same or different. In any event, the glue or adhesive used as a bonding agent must contain a flame retardant of similar chemical composition. Any suitable flame retardant is used in the plastic, resin or foam and the adhesive. In a preferred embodiment the flame retardant contains halogen and/or phosphate. A preferred flame retardant is tris-dichloropropyl phosphate and is available commercially as Celluflex FR-2. This material is said to have a specific gravity, 20/20° C. of about 1.513, a chlorine content of 49.1% by weight, and a phosphorus content of 7.2% by weight. Another flame retardant is tris-dibromopropyl phosphate and is available commercially as Firemaster T23P. Other suitable flame retardants containing halogen and phosphorus may be used such as tris-(bromo-chloropropyl)phosphate, tris-(chloroethyl) phosphate, etc.

In another embodiment the flame retardant is a polyhalopolyhydropolycyclicdicarboxylic acid or anhydride. Included in this embodiment is the acid or anhydride known in the art as Chlorendic or HET acid or anhydride and is prepared by the Diels-Alder addition reaction of maleic acid or anhydride and hexachlorocyclopentadiene. This acid or anhydride may be named 1,4,5,6,7,7-hexachlorodicyclo-(2.2.1)-5-heptene-2,3-di-carboxylic acid or anhydride. The preparation of these compounds is described in U.S. Pat. 2,606,910 and elsewhere. Another acid or anhydride in this embodiment is prepared by the Diels-Alder condensation of 1,3-butadiene with maleic acid to form 1,2,3-tetrahydrophthalic acid followed by Diels-Alder condensation with hexachlorocyclopentadiene. The product may be named 5,6,7,8,9,9-hexachloro-1,2,3,4, 4a,5,8,8a-octahydro-5,8-methano - 2,3 - naphthalenedicarboxylic acid, as well as the corresponding anhydride. The preparation of these compounds is set forth in detail in U.S. Pat. 3,017,431. It is understood that derivatives of these compounds such as amides, imides, salts and particularly phosphate salts may be used.

The particular flame retardant will be selected with reference to the particular plastic, resin or foam in the composite of the present invention. Certain flame retardants are more effective and more compatible in certain plastics, resins or foams and will be selected accordingly. It is understood that suitable solvents may be used as required or desired, but here again these are well known in the art and need not be repeated in the present specifications. The concentration of flame retardant used in the plastic, resin or foam is conventional and will depend on whether the flame retardant comprises a monomer in the preparation of the plastic, resin or foam or whether it is an additive incorporated subsequently in the plastic, resin or foam. Thus, the concentration may range from about 1% to about 40% by weight of the plastic, resin or foam. The concentration of the flame retardant to be incorporated in the adhesive will depend upon the particular flame retardant and the particular adhesive used, and may range from about 1% to about 25% or more by weight of the adhesive.

Any suitable adhesive is used in accordance with the present invention and will contain the selected flame retardant. When used for bonding polyurethane foam, a particularly preferred adhesive is a modified polyurethane formulation. This formulation may comprise the conventional recipe but, in a preferred embodiment, will omit blowing agents and surfactants. A very satisfactory adhesive was prepared to comprise on a weight basis, 100 parts of polyol, 27.20 parts of FR-2 flame retardant, 0.25 part triethylenediamine catalyst, 0.2 part of stannous octoate and 56.8 parts of toluene diisocyanate. This adhesive was used to bond two strips of polyurethane foam, prepared from a corresponding formulation but containing the blowing agents and surfactants and also containing the same flame retardant. The adhesive was brushed on one side of one strip and the two strips were mated, after which the composite was cured in an oven at 300° F. for 25 minutes. The resulting composite possessed excellent fire retardance and good adhesion. When desired, the foaming agents and surfactants may be allowed to remain in the glue formulation and this will result in the formation of a foamed layer between the strips.

The above is preferred for use with polyurethane. Other conventional adhesives may be used provided that a flame retardant of similar chemical composition to the flame retardant in the plastic, resin or foam is incorporated in the adhesive. For example, when the bonding is to be made to rubber, a latex-resorcinol-formaldehyde adhesive may be used, provided that the desired flame retardant is incorporated therein. Another example may comprise an epoxy resin which is particularly advantageous for use in bonding ABS, provided that chemically similar fire retardants are used in the adhesive and the ABS. A methylmethacrylate monomer or polymer adhesive, including a catalyst such as benzyl peroxide, can be used to cement acrylic sheet or molded and extruded acrylic parts. Here again, the same flame retardant should be incorporated in both the acrylic polymer and the adhesive. As hereinbefore set forth, the particular adhesive will be selected with regard to the particular plastic, resin or foam and/or the particular purpose for which the final composite is to be used.

The adhesive may be applied in any suitable manner including brushing, spraying, rolling or spreading and either by hand or by machine. In general, a thin layer of the adhesive will be sufficient but will vary with the size and type of members to be bonded together. In most cases the adhesive will contain a curing catalyst and the curing may be effected at room temperature but preferably is effected at an elevated temperature, which may range from 100° to 400° F.

The following examples are introduced to illustrate further the novelty and utility of the present invention but not with the intention of unduly limiting the same.

EXAMPLE I

As hereinbefore set forth, when two strips of polyurethane foam were bonded together by means of a commercial glue which did not contain a flame retardant corresponding to the flame retardant in the polyurethane foam, but was said to be flame retarded according to the manufacturer, the composite burned violently. This was believed to be caused by primarily a physical phenomenon, as it is believed that the glue line was acting as a heat trap and imparted a chimney effect in causing initial burning and maintaining the burning.

The formulation used in preparing the urethane foam is as follows:

| Ingredient: | Parts by weight |
| --- | --- |
| Polyol-Witco G-3530 (Reaction product of propylene oxide and glycerin) | 100 |
| Flame retardant (FR-2) | 7.3 |
| Flame retardant (T23P) | 11.8 |
| Polymeric silicone surfactant L-540 | 1.5 |
| Deionized water | 5.0 |
| Ethyl morpholine | 0.3 |
| Stabilized stannous octoate (T-9) (stabilizer is 2,6-di-tertiarybutyl-4-methylphenol) | 0.15 |
| Triethylenediamine catalyst | 0.2 |
| Freon 11 | 4.0 |
| Toluene diisocyanate | 56.8 |

The foam was prepared by first mixing the polyol, flame retardants and polymeric silicone surfactant and stirring the mixture for 30 seconds with water. The triethylenediamine catalyst and ethyl morpholine then were added and the mixture was further stirred for about 11 minutes, after which the stabilized stannous octoate was added and the mixture was stirred for 15 seconds, then toluene diisocyanate and Freon were added and the mixture was stirred at high speed for 7 seconds, after which the mixture was poured into a warm mold. The mixture was cured for 25 minutes at 300° F. and post-cured for 2 hours at 200° F. This particular formulation included two flame retardants: FR–2 (tris-dichloropropyl phosphate) and LV–T23P (tris-dibromopropyl phosphate). Strips of 12" by 2" by ½" were cut from the foam block.

As an attempt to impart non-burning properties to the composite, two strips of the above polyurethane foam (12" by 2" by ½"), previously found to be non-burning, were joined together with glass cloth inserted between the strips. This did not avoid the burning as all but a small portion of the foam was consumed. This was surprising because the polyurethane foam strip by itself was non-burning and the glass cloth by itself was non-burning. Thus, it would be expected that the composite would be non-burning.

Another attempt was made using a copper strip between the two strips of polyurethane foam. The foam was completely consumed by burning.

EXAMPLE II

This example demonstrates the present invention in which a modified polyurethane glue was prepared to contain the same flame retardant as in the polyurethane foam strips.

The adhesive was prepared from substantially the same formula as described above except that it omitted the water, the silicone surfactant, the Freon and the morpholine. However, this formula contained 27.20 parts of flame retardant FR–2 but no flame retardant LV–T23P. The adhesive was prepared by the same general steps as described above.

A thin layer of the adhesive was brushed on the inside surface of one strip and this strip was mated with another strip of the polyurethane foam. The composite then was cured in an oven for 25 minutes at 300° F. The resultant composite possessed excellent fire retardant properties and good adhesion. The burning rate was evaluated according to FAR method 25.853, and reported as ¾" consumed in 12 second of the application of gas burner flame. Upon removal of the flame, burning ceased immediately. This more than satisfactorily passes the minimum requirements of the above specification and the laminate thus is classified as non-burning.

EXAMPLE III

Another composite was made in substantially the same manner as described in Example II, except that the adhesive was of the same formulation as the polyurethane foam strips and thus also included the blowing agents and surfactant. Here again, the flame retardants were of similar chemical composition in both the adhesive and the foam strips. After curing in the same manner, the adhesive formed a hard foam layer between the strips and resulted in excellent adhesion. When evaluated in the same manner as described above, ¼" was consumed in 14 seconds. Here again, it will be noted that the composite would be classified as non-burning when evaluated according to this method.

EXAMPLE IV

Another polyurethane foam is prepared in substantially the same manner as described in Example II except that the flame retardant is 5,6,7,8,9,9 - hexachloro - 1,2,3,4,4a,5,8,8a - octahydro-5,8-methano-2,3-naphthalenedicarboxylic anhydride and was used in a concentration of 25 parts by weight. Similarly, an adhesive is prepare from the same formulation but omitting the water, blowing agents and surfactant but containing 25 parts of the same polyhalopolyhydropolycyclicdicarboxylic anhydride flame retardant. The adhesive is applied to one strip of the polyurethane foam and then is mated with another strip of the polyurethane foam. The strips then are cured in the same manner as described above. This produces a composite possessing good flame retardant and adhesion properties.

EXAMPLE V

The polyurethane foam strip prepared as described in Example II is bonded to a strip of ABS (acrylonitrile-butadiene-styrene) by means of an epoxy glue containing flame retardant FR–3. A composite possessing good flame retardant and adhesion properties is prepared.

EXAMPLE VI

The composite of this example includes as one member, a polyurethane foam prepared as described in Example III and copper foil. The polyurethane foam contains FR–2 flame retardant. The glue used as bonding agent also contains FR–2 flame retardant. The glue is brushed on one side of the polyurethane strip and then the copper foil is mated, after which the composite is cured in an oven at 300° F. for 30 minutes. The composite possesses good flame retardant properties and also good adhesion properties.

EXAMPLE VII

A steel sheet is laminated with rigid polyurethane foam by brushing on the steel sheet the flame retarded adhesive solution, to be described later, allowing it to dry and contacting with a sheet of rigid urethane foam, applying pressure by means of rolls, and finally curing. The rigid foam is flame retarded with commercial reactive type flame retardant containing about 22% by weight of bromine and 2.5% by weight of phosphorus.

The adhesive is composed of about 7 parts of toluene-2,4-diisocyanate reaction product with glycerol and diethylene glycol dissolved in ethylacetate and about 35 parts of polyurethane elastomer composed of polyester-amidediisocyanate reaction product containing 6% of tris-(1-bromo-3-chloroisopropyl)-phosphate, all dissolved in methylethyl ketone and 2-ethoxyethanol acetate. The bonded composition does not show the above discussed chimney effect and is flame retarded.

EXAMPLE VIII

In this example, leather is bonded to flexible urethane by means of an adhesive composed of hydroxyl group terminated poly-(ethylene adipate) of a molecular weight of about 2000, reacted wtih 4,4'-methylenebis-phenylisocyanate and then reacted with a deficient amount of hydrogenated bis - phenol - A containing tris-(dichloropropyl)phosphate at a concentration to give 0.6% by weight of phosphorus in the resulting thermoplastic urethane, which is then dissolved in mixed solvents composed of toluene, methylethyl ketone and isopropanol. The adhesive solution is brushed onto the leather as mentioned above. A flexible urethane foam sheet, fire retarded with a commercial reactive polyol containing phosphorus and chlorine, is then rolled on the leather, and finally cured. The resulting bond is strong, flexible and the composition is fire retarded.

I claim as my invention:

1. An article of manufacture composed of first and second members, said members being selected from the group consisting of polyurethane foam and ABS resin and each containing a flame retardant, said members being bonded together by an adhesive selected from the group consisting of polyurethane and epoxy compositions and containing a flame retardant, wherein the flame retardants in said first and second members and in said adhesive are selected from the group consisting of tris-(haloalkyl)-phosphate and polyhalopolyhydropolycyclicdicarboxylic acid and anhydride thereof.

2. The article of manufacture of claim 1 wherein the flame retardant in said members and in said adhesive is tris-dichloropropyl phosphate.

3. The article of manufacture of claim 1 wherein the flame retardant in said members and in said adhesive is tris-dibromopropyl phosphate.

4. The article of manufacture of claim 1 wherein the flame retardant in said members and in said adhesive is a polyhalopolyhydropolycyclicdicarboxylic acid or anhydride.

5. The article of manufacture of claim 4 wherein the flame retardant in said members and in said adhesive is 5,6,7,8,9,9 - hexachloro - 1,2,3,4,4a,5,8,8a - octahydro-5,8-methano-2,3-naphthalenedicarboxylic anhydride.

6. The article of manufacture of claim 1 wherein said first and second members are polyurethane foam and both members and said adhesive all contain tris-dichloropropyl phosphate flame retardant.

7. The article of manufacture of claim 1 wherein said first and second members are polyurethane foam and both members and said adhesive all contain tris-dibromopropyl phosphate flame retardant.

8. The article of manufacture of claim 1 wherein said first member is polyurethane and said second member is ABS.

References Cited

UNITED STATES PATENTS

| | | | |
|---|---|---|---|
| 2,905,582 | 9/1959 | Coleman, Jr. et al. | 161—190 X |
| 3,051,601 | 8/1962 | Schick | 161—190 X |
| 3,178,490 | 4/1965 | Petrino et al. | 260—2.5 X |
| 3,356,650 | 12/1967 | McElroy | 260—77.5 |
| 3,465,006 | 9/1969 | Schmerling | 260—346.6 |
| 3,483,158 | 12/1969 | Beacham et al. | 252—8.1 X |
| 3,496,058 | 2/1970 | Schroter et al. | 161—190 X |
| 3,498,877 | 3/1970 | Christoffersen et al. | 161—403 X |
| 3,522,204 | 7/1970 | Savides | 252—8.1 X |
| 3,034,939 | 5/1962 | Newkirk et al. | 161—184 |
| 3,278,580 | 10/1966 | Worsley et al. | 260—468 |

OTHER REFERENCES

Modern Plastics Encyclopedia 1967, September 1966, vol. 44, No. 1A, McGraw-Hill, New York, pp. 451–455.

JOHN T. GOOLKASIA, Primary Examiner

D. J. FRITSCH, Assistant Examiner

U.S. Cl. X.R.

161—159, 184, 190, 191, 255, 403